(12) United States Patent
Hou et al.

(10) Patent No.: US 12,228,822 B2
(45) Date of Patent: Feb. 18, 2025

(54) BACKLIGHT MODULE AND LIQUID CRYSTAL DISPLAY DEVICE

(71) Applicants: BEIJING BOE DISPLAY TECHNOLOGY CO., LTD., Beijing (CN); BOE TECHNOLOGY GROUP CO., LTD., Beijing (CN)

(72) Inventors: Shanlei Hou, Beijing (CN); Zhaoshou Tian, Beijing (CN); Xiaodi Sun, Beijing (CN); Bochang Wang, Beijing (CN); Haijun Shi, Beijing (CN); Zhuang Xu, Beijing (CN); Changjia Fu, Beijing (CN); Xiangyu Yue, Beijing (CN)

(73) Assignees: Beijing BOE Display Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/247,556

(22) PCT Filed: Apr. 28, 2022

(86) PCT No.: PCT/CN2022/089757
§ 371 (c)(1),
(2) Date: Mar. 31, 2023

(87) PCT Pub. No.: WO2023/206199
PCT Pub. Date: Nov. 2, 2023

(65) Prior Publication Data
US 2024/0361636 A1    Oct. 31, 2024

(51) Int. Cl.
*G02F 1/13357* (2006.01)

(52) U.S. Cl.
CPC .. *G02F 1/133608* (2013.01); *G02F 1/133605* (2013.01); *G02F 1/133606* (2013.01); *G02F 1/133611* (2013.01)

(58) Field of Classification Search
CPC ......... G02F 1/133608; G02F 1/133605; G02F 1/133606; G02F 1/133611
See application file for complete search history.

(56) References Cited

U.S. PATENT DOCUMENTS

| 2011/0134629 A1 | 6/2011 | Kim |
| 2018/0059483 A1 | 3/2018 | Ma et al. |
| 2022/0214582 A1* | 7/2022 | Park .................. G02F 1/133617 |

FOREIGN PATENT DOCUMENTS

| CN | 1648741 A | 8/2005 |
| CN | 101071229 A | 11/2007 |

(Continued)

OTHER PUBLICATIONS

English Machine Translation of JP 2020030341, Ikeda et al (Year: 2024).*

*Primary Examiner* — Donald L Raleigh
(74) *Attorney, Agent, or Firm* — The Webb Law Firm (57) ABSTRACT

A backlight module and a liquid crystal display device are provided. The backlight module includes a light-emitting assembly, an optical processing assembly and a support structure located between the light-emitting assembly and the optical processing assembly and connected to the light-emitting assembly. The support structure includes a base and a support member, the base being fixedly connected to the light-emitting assembly. The support member has a supporting end and a connecting end. The supporting end faces the optical processing assembly. The connecting end and the base form a backout structure configured to cause the connecting end to back out in a direction away from the optical processing assembly in a case where the supporting end is squeezed by the optical processing assembly, so that can eliminate problems caused by stress concentration of an internal support structure when a backlight module is under pressure.

19 Claims, 6 Drawing Sheets

(56) References Cited

FOREIGN PATENT DOCUMENTS

| | | |
|---|---|---|
| CN | 100376974 C | 3/2008 |
| CN | 101852403 A | 10/2010 |
| CN | 106200126 A | 12/2016 |
| CN | 206115086 U | 4/2017 |
| CN | 209992784 U | 1/2020 |
| CN | 112162434 A | 1/2021 |
| CN | 112382208 A | 2/2021 |
| CN | 112684634 A | 4/2021 |
| CN | 113031342 A | 6/2021 |
| CN | 215219368 U | 12/2021 |
| JP | 2020030341 A * | 2/2020 .............. G09F 9/00 |
| KR | 100921469 B1 | 10/2009 |

* cited by examiner

BACKLIGHT MODULE AND LIQUID CRYSTAL DISPLAY DEVICE

CROSS-REFERENCE TO RELATED APPLICATIONS

This application is the United States National Phase of International Patent Application No. PCT/CN2022/089757, filed Apr. 28, 2022, the disclosure of which is hereby incorporated by reference in its entirety.

BACKGROUND OF THE INVENTION

Field of the Invention

The present disclosure relates to display technology, in particular to a backlight module and a liquid crystal display device.

Description of Related Art

Some liquid crystal display devices use a direct-type backlight module to provide backlight to a liquid crystal screen. Light emitted by light sources in such a backlight module is homogenized by a diffusion plate on a back side of the liquid crystal screen. In order to ensure the light homogenizing effect, it usually needs to maintain a design gap between the diffusion plate and a reflector sheet of the backlight module. To maintain the design gap, in some related art, a plurality of support pegs are provided between the diffusion plate and the reflector sheet to support the diffusion plate in order to indirectly support the liquid crystal screen supported by the diffusion plate.

SUMMARY OF THE INVENTION

In an aspect of the present disclosure, a backlight module is provided, including: a light-emitting assembly; an optical processing assembly located on a light-exiting side of the light-emitting assembly; and a support structure located between the light-emitting assembly and the optical processing assembly and connected to the light-emitting assembly, and configured to support the optical processing assembly, wherein the support structure includes a base and a support member, the base is fixedly connected to the light-emitting assembly, the support member has a supporting end and a connecting end, the supporting end faces the optical processing assembly, and the connecting end and the base form a backout structure configured to cause the connecting end to back out in a direction away from the optical processing assembly in a case where the supporting end is squeezed by the optical processing assembly.

In some embodiments, the backout structure includes: an unidirectional backout structure configured to maintain a backout displacement after the connecting end backs out in the direction away from the optical processing assembly.

In some embodiments, the unidirectional backout structure includes: a first elastic limiting part having a plurality of limiting teeth arranged in a backout direction of the connecting end; and a first cooperating part having a tooth profile structure, wherein the tooth profile structure is configured to engage with the plurality of limiting teeth at a plurality of backout displacements in the backout direction of the connecting end to maintain the backout displacements.

In some embodiments, the first cooperating part has two sets of tooth profile structures located on two opposite side surfaces of the first cooperating part, respectively, and the first elastic limiting part has two opposite sets of limiting teeth which are configured to engage with the two sets of tooth profile structures of the first cooperating part, respectively, on two sides of the first cooperating part.

In some embodiments, the first elastic limiting part is provided on the base, and the first cooperating part is provided at the connecting end.

In some embodiments, the backout structure includes: a reset backout structure configured to reset the connecting end in a direction close to the optical processing assembly after the connecting end backs out in the direction away from the optical processing assembly and when the supporting end is not squeezed by the optical processing assembly.

In some embodiments, the reset backout structure includes: a second elastic limiting part having a first wedge-shaped surface inclined relative to the backout direction of the connecting end; and a second cooperating part having a second wedge-shaped surface inclined relative to the backout direction of the connecting end, wherein the second wedge-shaped surface is configured to slide relative to the first wedge-shaped surface during relative movement of the second elastic limiting part and the second cooperating part in the backout direction of the connecting end.

In some embodiments, the second cooperating part has two sets of second wedge-shaped surfaces located on two opposite sides of the second cooperating part, respectively, and the second elastic limiting part has two opposite sets of first wedge-shaped surfaces which are configured to be respectively in surface-contact with the two sets of second wedge-shaped surfaces of the second cooperating part on the two sides of the second cooperating part, and slide relative to the two sets of second wedge-shaped surfaces in the backout direction or a reset direction of the connecting end.

In some embodiments, the second elastic limiting part is provided on the base, and the second cooperating part is provided at the connecting end.

In some embodiments, the connecting end further includes an anti-separation structure located on a side of the cooperating part away from the supporting end, and the anti-separation structure is configured to restrict the second cooperating part from separating from the second elastic limiting part along the reset direction of the connecting end.

In some embodiments, the anti-separation structure includes a barb having a guide ramp at an end of a side away from the cooperating part.

In some embodiments, the connecting end further forms a guide structure together with the base, and the guide structure is configured to guide the connecting end in the backout direction of the connecting end relative to the base.

In some embodiments, the guide structure includes a slide rail cooperating structure.

In some embodiments, the base includes: a bottom plate arranged on a surface on a side of the light-emitting assembly adjacent to the optical processing assembly; and a mounting seat arranged on the bottom plate and having an insertion slot, a slot wall of the insertion slot including an elastic sheet segment and a guide segment, wherein the connecting end includes an insertion column configured to connect the insertion slot by insertion into the insertion slot, and an outer wall of the insertion column includes a backout segment forming the backout structure together with the elastic sheet segment and a slide segment forming a slide rail cooperating structure together with the guide segment.

In some embodiments, the bottom plate has a positioning slot or a positioning hole for defining position of the bottom plate relative to the light-emitting assembly.

In some embodiments, in a state where the connecting end reaches a maximum backout position relative to the base, a distance from a top end of the supporting end to a bottom end of the base is greater than or equal to a minimum optical distance of the backlight module.

In some embodiments, the connecting end has a step at a position connecting the supporting end, and the step is configured to limit a maximum backout position of the connecting end relative to the base.

In some embodiments, the supporting end is configured to be in contact with or have a predetermined gap from the optical processing assembly that is not flexurally deformed by an action of a squeezing force or by an action of self-weight, and the predetermined gap is k times a maximum amount of flexural deformation of the optical processing assembly, where k=0.3 to 1.

In some embodiments, k=0.8.

In some embodiments, the light-emitting assembly includes: a back-plate; and a plurality of light-emitting units arranged on the back-plate, wherein the base is fixedly arranged on the back-plate.

In some embodiments, the light-emitting assembly further includes: a bottom reflection sheet arranged on a surface on a side of the back-plate adjacent to the optical processing assembly, wherein the base is bonded to a surface on a side of the bottom reflection sheet adjacent to the optical processing assembly.

In some embodiments, the optical processing assembly includes: a diffusion plate located on a side of the support structure away from the light-emitting assembly, and contacting or squeezing the supporting end when the diffusion plate is flexurally deformed towards the light-emitting assembly.

In some embodiments, the optical processing assembly further includes at least one of the following: a diffusion sheet located on a side of the diffusion plate away from the light-emitting assembly; and a light enhancement sheet located on a side of the diffusion plate away from the light-emitting assembly.

In an aspect of the present disclosure, a liquid crystal display device is provided, including: a backlight module described above; and a liquid crystal panel located on a light exit side of the backlight module.

BRIEF DESCRIPTION OF THE DRAWINGS

The drawings constituting a part of the specification describe embodiments of the present disclosure, and together with the specification, serve to explain the principle of the present disclosure.

With reference to the accompanying drawings, the present disclosure can be understood more clearly according to the following detailed description, in which.

It should be appreciated that the sizes of various parts shown in the drawings are not drawn in accordance with actual proportional relationships. In addition, same or similar reference numerals represent same or similar components.

DESCRIPTION OF THE INVENTION

Various exemplary embodiments of the present disclosure will now be described in detail with reference to the accompanying drawings. The description of exemplary embodiments is only illustrative, and in no way serves as any limitation on the present disclosure and its application or use. The present disclosure can be implemented in many different forms and is not limited to the embodiments described herein. These embodiments are provided to make the present disclosure thorough and complete and to express fully the scope of the present disclosure to those skilled in the art. It is to be noted that unless specifically stated otherwise, the relative arrangement of components and steps, material components, numerical expressions and numerical values set forth in these embodiments should be construed as merely exemplary, rather than as limitations.

The words "first", "second" and the like used in present disclosure do not indicate any order, quantity or importance, but are only used to distinguish different parts. The word "comprise" or "include" or the like means that an element preceding the word covers listed elements following the word, and does not exclude the possibility of also covering other elements. The words "up", "down", "left", "right" and the like are only used to indicate a relative positional relationship. When the absolute position of a described object changes, the relative positional relationship may also change accordingly.

In the present disclosure, when a particular device is described to be located between a first device and a second device, there may or may not be an intermediate device between the particular device and the first device or the second device. When a particular device is described to be connected to other device, the particular device may be directly connected to the other device without an intermediate device, or it may be not directly connected to the other device but there is an intermediate device.

All terms (including technical or scientific terms) used in the present disclosure have the same meaning as understood by those of ordinary skill in the field of the present invention, unless otherwise defined specifically. It should also be understood that terms such as those defined in generic dictionaries should be understood to have meanings consistent with their meanings in the context of the related art, and should not be construed in an idealized or overly formalized sense, unless so defined explicitly herein.

Technologies, methods, and equipment known to those of ordinary skill in the related art may be not discussed in detail, but where appropriate, the technologies, methods, and equipment should be regarded as part of the specification.

Figure 1:
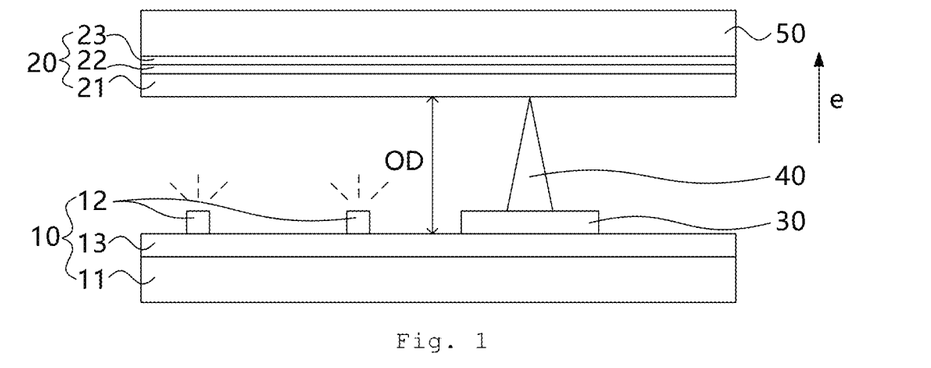
FIG. 1 is a structural diagram of an embodiment of a liquid crystal display device according to the present disclosure.
Figure 2:
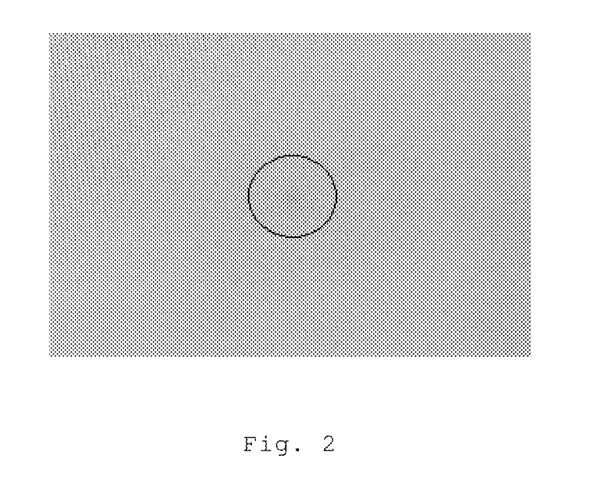
FIG. 2 is a schematic diagram of an undesirable phenomenon of a dark spot on a screen, due to a high local support pressure, for a liquid crystal display device using a direct-type backlight module in the related art.
Figure 3:
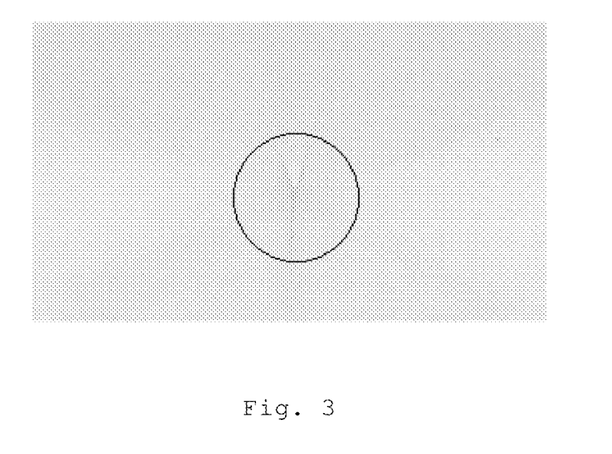
FIG. 3 is a schematic diagram of an undesirable phenomenon of diffusion plate cracking, resulting from local stress concentration during a push test, for a liquid crystal display device using a direct-type backlight module in the related art.

FIG. 1 is a structural diagram of an embodiment of a liquid crystal display device according to the present disclosure. FIG. 2 is a schematic diagram of an undesirable phenomenon of a dark spot on a screen, due to a high local support pressure, for a liquid crystal display device using a direct-type backlight module in the related art. FIG. 3 is a schematic diagram of an undesirable phenomenon of diffusion plate cracking, resulting from local stress concentration during a push test, for a liquid crystal display device using a direct-type backlight module in the related art.

In some related art, a plurality of support pegs are provided between a diffusion plate and the reflector sheet to support the diffusion plate in order to indirectly support a liquid crystal screen supported by the diffusion plate. The liquid crystal screen is relatively sensitive to pressure due to its imaging principle, and even distribution of support forces of the plurality of support pegs is difficult to achieve. When there is a large local support pressure on the liquid crystal screen, the capacitive environment of corresponding local pixels changes, affecting normal deflection of liquid crystals, such that a local light transmission rate of the screen decreases, resulting in an undesirable dark spot on the screen (see an area enclosed by a black circle in FIG. 2). In addition, during a push test of a display device, stress concentration at the location of the support pegs may cause the screen or the diffusion plate to crack (see an area enclosed by a black circle in FIG. 3).

In view of this, embodiments of the present disclosure provide a backlight module and a liquid crystal display device that can eliminate problems caused by stress concentration of an internal support structure when a backlight module is under pressure.

Referring to FIG. 1, embodiments of the present disclosure provide a liquid crystal display device including a backlight module and a liquid crystal panel 50. The backlight module is configured to provide backlight to the liquid crystal panel 50. The liquid crystal panel 50 is located on a light-exiting side of the backlight module, and is capable of displaying still or continuous pictures under the backlight provided by the backlight module. In addition, the liquid crystal display device may further include a frame for mounting the backlight module and the liquid crystal panel 50, a cover plate arranged outside the liquid crystal panel 50, a power supply, a control circuit, etc., which will not be described here.

In the above-mentioned embodiment of the liquid crystal display device, the backlight module may include: a light-emitting assembly 10, an optical processing assembly 20, and a support structure located between the light-emitting assembly 10 and the optical processing assembly 20. The light-emitting assembly 10 is configured to emit light. The backlight module can use direct-type or edge-type light-emitting elements to form a direct-type or edge-type backlight module.

Using FIG. 1 as an example, the light-emitting assembly 10 may include: a back-plate 11 and a plurality of light-emitting units 12. The plurality of light-emitting units 12 are arranged on the back-plate 11. The light-emitting units 12 can be point light sources or line light sources, such as LED point light sources or LED line light sources. The plurality of light-emitting units 12 can be arranged in an array or other means on a surface of the back-plate 11. Depending on characteristics of the back-plate 11, the light-emitting units 12 can be arranged on a side of the back-plate 11 adjacent to the optical processing assembly 20, or on a side of the transparent back-plate 11 (e.g., glass back-plate or the like) away from the optical processing assembly 20.

Referring to FIG. 1, the light-emitting assembly 10 may further include a bottom reflector sheet 13. The bottom reflector sheet 13 is arranged on the surface of one side of the back-plate 11 adjacent to the optical processing assembly 20, and is capable of reflecting light irradiated thereon to the optical processing assembly 20, thereby improving the utilization rate of light emitted from the light sources. The reflector sheet can be in the form of a reflective film formed on the back-plate, or a reflector sheet fixed to the surface of the back-plate by bonding or other means. For an edge-type backlight module, the light-emitting assembly 10 in embodiments of the present disclosure can also achieve light uniformity by a reflective effect of the bottom reflector sheet 13, thereby replacing a light guide plate. In some embodiments, the light-emitting units 12 can also be arranged on a surface of the bottom reflector sheet 13.

The optical processing assembly 20 is located on a light-exiting side of the light-emitting assembly 10, and can perform various optical processing on the light emitted by the light-emitting assembly 10, such as homogenizing or enhancing the light, as needed. In FIG. 1, a light-exiting direction e of the light-emitting assembly 10 located below is a direction pointed vertically upward toward the optical processing assembly 20.

Using FIG. 1 as an example, the optical processing assembly 20 may include a diffusion plate 21. The diffusion plate 21 is located on a side of the support structure away from the light-emitting assembly 10, and is capable of diffusing the light emitted by the point light sources or line light sources so that the light is uniformly distributed on the plane of the diffusion plate 21. Referring to FIG. 1, in some embodiments, the optical module 20 may further include at least one of a diffusion sheet 22 and a brightness enhancement sheet 23. The diffusion sheet 22 can be located on a side of diffusion plate 21 away from the light-emitting assembly 10, and configured to further diffuse the light diffused by the diffusion plate to improve light uniformity. The brightness enhancement sheet 23 can be a prism sheet, which can be located on the side of the diffusion plate 21 away from the light-emitting assembly 10, and configured to concentrate directions of the diffused light, to achieve a brightness enhancement effect. The brightness enhancement sheet 23 can also be a brightness enhancement film or the like to achieve a brightness enhancement effect.

In this embodiment, the support structure is located between the light-emitting assembly 10 and the optical processing assembly 20 and is connected to the light-emitting assembly 10, and is configured to support the optical processing assembly 20. The support structure includes a base 30 and a support member 40, and the base 30 is fixedly connected to the light-emitting assembly 10. In FIG. 1, the base 30 can be fixedly arranged on the back-plate 11. For a light-emitting assembly having a bottom reflector sheet, the base 30 can be bonded to a surface on a side of the bottom reflector sheet 13 adjacent to the optical processing assembly 20 by double-sided adhesive or the like.

The base 40 and the support member 30 are of a split-type design, in which the support member 30 and the base 40 can be formed by injection molding respectively and then assembled. Compared with an integrated support structure, the support structure in this embodiment can adopt a more mature and lower-cost injection molding method and achieve a higher yield without the need for a double-shot molding process based on a double-shot molding machine, thus effectively reducing mold processing difficulty and a manufacturing cost.

Figure 4:
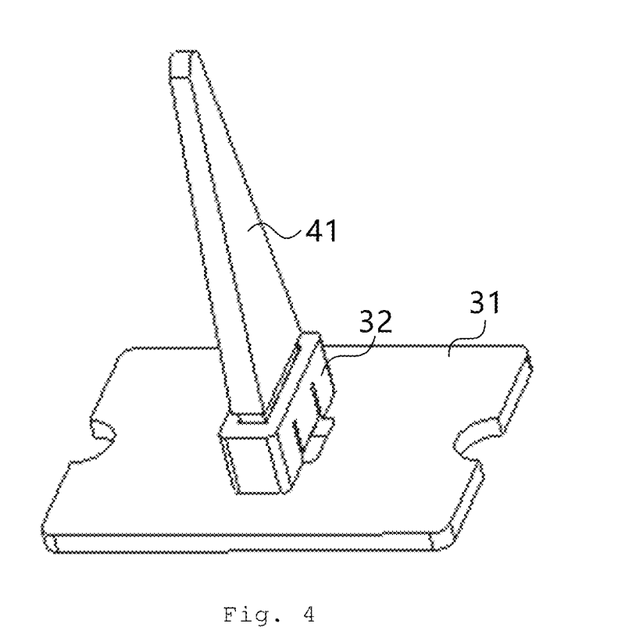
FIG. 4 is an installation diagram of a support structure in an embodiment of a backlight module according to the present disclosure.
Figure 5:
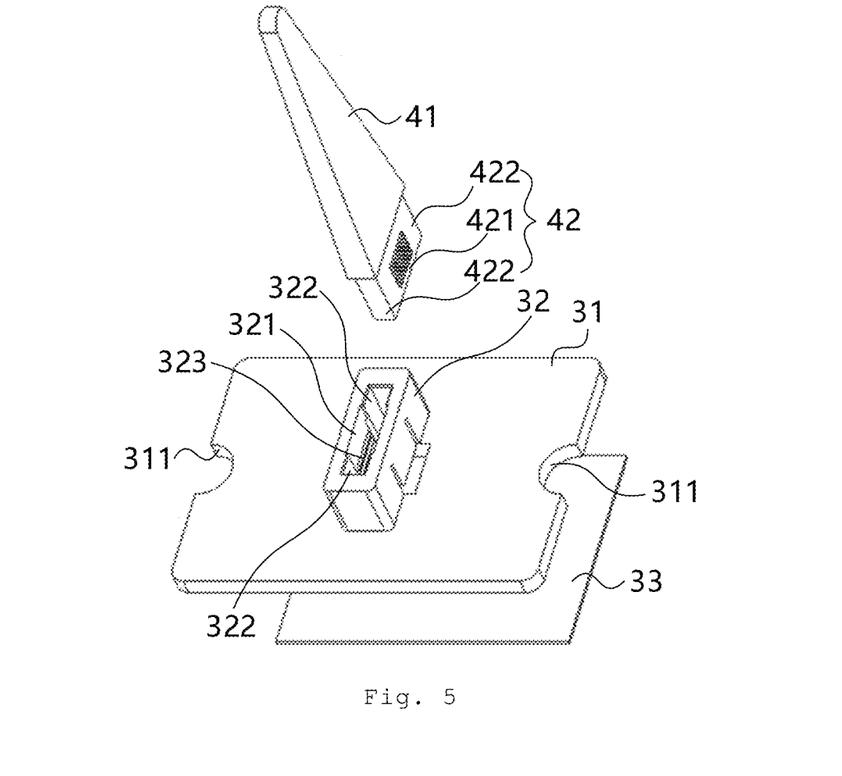
FIG. 5 is an exploded diagram of a support structure in an embodiment of a backlight module according to the present disclosure.
Figure 6:
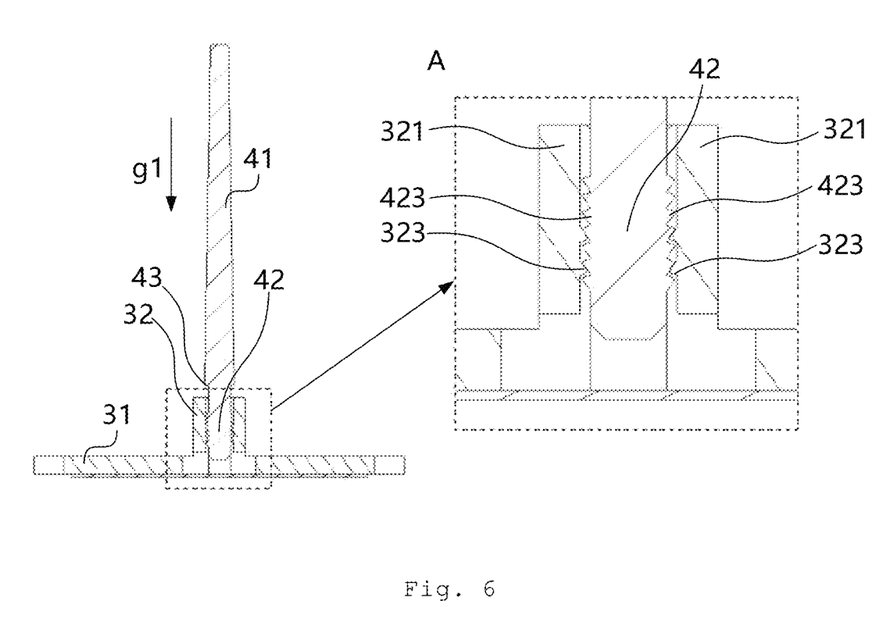
FIG. 6 is a cross-sectional structure and partial enlarged diagram of the support structure in the embodiment shown in FIG. 5.
Figure 7:
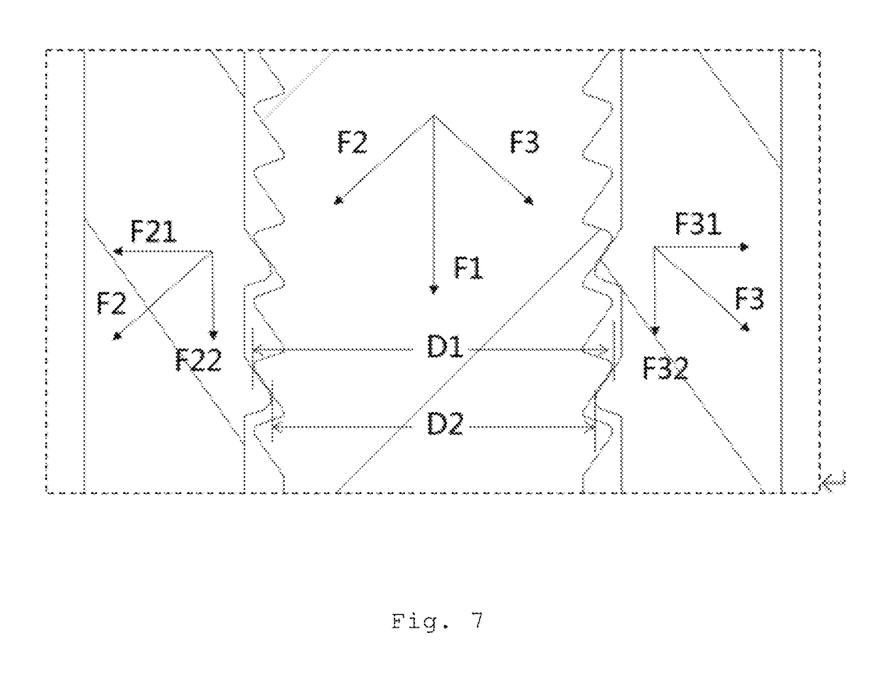
FIG. 7 is a force resolution diagram of engagement of a tooth profile structure and limiting teeth in FIG. 6.
Figure 8:
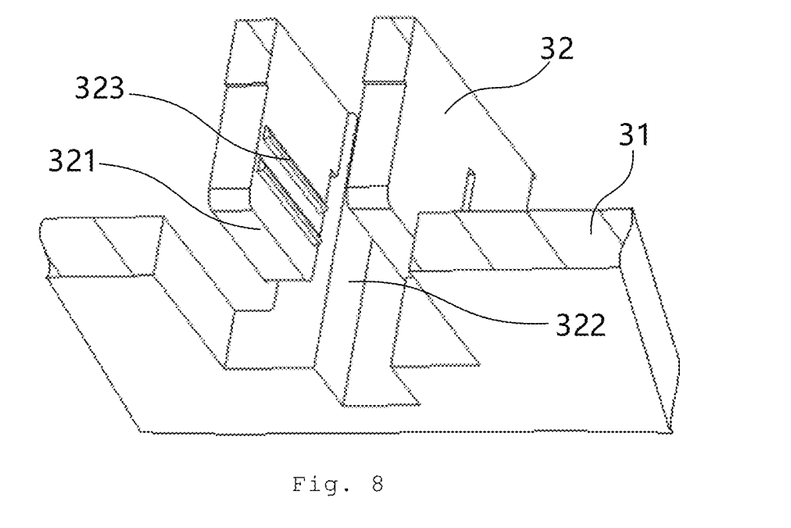
FIG. 8 is a partial sectional structure diagram of a bottom plate and a mounting seat of the support structure in the embodiment shown in FIG. 5.

FIG. 4 is an installation diagram of a support structure in an embodiment of a backlight module according to the present disclosure. FIG. 5 is an enlarged diagram of a support structure in an embodiment of a backlight module according to the present disclosure. FIG. 6 is a cross-sectional structure and partial enlarged diagram of the support structure in the embodiment shown in FIG. 5. FIG. 7 is a force resolution diagram of engagement of a tooth profile structure and limiting teeth in FIG. 6. FIG. 8 is a partial sectional structure diagram of a bottom plate and a mounting seat of the support structure in the embodiment shown in FIG. 5.

Referring to FIGS. 4 to 8, in some embodiments, the support member 40 has a supporting end 41 and a first connecting end 42. The supporting end 41 faces the optical processing assembly 20, and the connecting end 42 and the base 30 form a backout structure. The backout structure is configured to cause the connecting end 42 to back out in a direction away from the optical processing assembly 20 in a case where the supporting end 41 is squeezed by the optical processing assembly 20. The optical processing assembly 20 is capable of squeezing downward the supporting end 41 of the support member 40 when being squeezed from above or flexed downward by self-weight. After the supporting end 41 is subjected to a certain pressure, it can cause the connecting end 42 to back out a certain displacement downward relative to the base 30 with the flexure of the optical processing assembly 20. This releases a stress formed on the optical processing assembly 20 due to being squeezed by the supporting end 41, to eliminate the risks of a local display dark spots on the liquid crystal display device due to stress concentration and resulting crack of the liquid crystal panel or the optical processing assembly 20 during a push test.

In addition, such a support structure can also eliminate stress concentration problems caused by processing aspects such as tolerance fluctuations in the flatness of the back-plate and the height of the support member.

Referring to FIG. 6, in some embodiments, the above-mentioned backout structure includes an unidirectional backout structure A. The unidirectional backout structure A is configured to maintain a backout displacement after the connecting end 42 backs out in the direction away from the optical processing assembly 20. Such a structure can cause the connecting end 20 to back out a preset displacement in a case where the supporting end 41 is squeezed to a certain degree, thereby releasing a squeezing stress, and can be maintained at a backout position after the backout to achieve a relatively stable support function.

In order to make the unidirectional receding process of the unidirectional backout structure A more controllable, with reference to FIGS. 5 to 8, in some embodiments, the unidirectional backout structure A includes: a first elastic limiting part and a first cooperating part. The first elastic limiting part has a plurality of limiting teeth 323 arranged in the backout direction of the connecting end 42. The first cooperating part has a tooth profile structure 423, and the tooth profile structure 423 is configured to engage with the plurality of limiting teeth 323 at a plurality of backout displacements in the backout direction (referring to a direction corresponding to an arrow g1 in FIG. 6) of the connecting end 42 so as to maintain the backout displacements.

In this way, after the supporting end 41 is squeezed to a certain degree, the connecting end 20 is caused to back out at least one tooth pitch in the backout direction after overcoming an engagement force of the tooth profile structure 423 and the plurality of limiting teeth 323. After the backout of at least one tooth pitch, a squeezing force on the supporting end 41 is released. At that point, since the squeezing force on the supporting end 41 has not reached a certain degree, the tooth profile structure 423 and the plurality of limiting teeth 323 cooperate stably in another engagement position, such that the supporting end 41 can achieve a stable support function.

The first elastic limiting part can be provided on the base 30, and correspondingly the first cooperating part can be provided on the support member 40. In some other embodiments, the first elastic limiting part can also be provided on the support member 40, and correspondingly the first cooperating part can be provided on the base 30.

In order to ensure that the support structure remains stable during the backout, in some embodiments, the connecting end 42 further forms a guide structure together with the base 30, and the guide structure is configured to guide the backout direction of the connecting end 42 relative to the base 30. For example, the guide structure includes a slide rail cooperating structure. When the connecting end 42 backs out in the direction away from the optical processing assembly 20, the slide rail cooperating structure can cause the connecting end 42 to back out in a specified direction, to avoid that the support member is stuck or bent and deformed under a deviated force when its direction is not accurate.

In FIGS. 5 and 6, the base 30 may further include a bottom plate 31 and a mounting seat 32. The bottom plate 31 is arranged on a surface of a side of the light-emitting assembly 10 adjacent to the optical processing assembly 20, for example being bonded to a surface of the back-plate 11 or a surface of the bottom reflector sheet 13 of the light-emitting assembly 10 by means of an adhesive layer (e.g. double-sided adhesive 33). The mounting seat 32 is arranged on the bottom plate 31 and has an insertion slot, a slot wall of which includes an elastic sheet segment 321 and a guide segment 322.

In order to achieve good elasticity of the elastic sheet segment 321, referring to FIG. 8, through-slots may be provided on a plurality of lateral sides of the elastic sheet segment 321. For example, through-slots are provided on its lateral sides in three directions, such that it is restricted only on a lateral side not provided with a through-slot. In this way, the elastic sheet segment 321 can be bent and deformed when being squeezed, and can be reset to an initial position when a squeezing force is removed. A first elastic limiting part on the base 30 can be obtained by providing a plurality of limiting teeth 323 on a surface of the elastic sheet segment 321.

The guide segment 322 of the insertion slot except the elastic sheet segment 321, can achieve the guiding effect of the afore-mentioned guide structure in the backout direction. Referring to FIGS. 5 and 8, the guide segment 322 can include U-shaped structures located on two sides of the elastic sheet segment 321, in the insertion slot. This can effectively improve the stability during relative movement between the connecting end 42 and the mounting seat 32.

Cooperating with the insertion slot of the mounting seat 32 is an insertion column included at the connecting end 42. The insertion column is configured to connect the insertion slot by insertion into the insertion slot. An outer wall of the insertion column can include a backout segment 421 forming the backout structure together with the elastic sheet segment 321 and a slide segment 422 forming a slide rail cooperating structure together with the guide segment 322. A first cooperating part provided on the support member 40 can be obtained by providing a tooth profile structure 423 on a surface of the backout segment 421. The slide segment 422 on two sides of the backout segment 421 can be a cuboid-shaped bump, which slidably cooperates with the U-shaped structure on the two sides of the elastic sheet segment 321 in the insertion slot to achieve a backout guidance function.

In FIG. 5, the backout segment 421 and the slide segment 422 are made in one piece for better strength and stiffness. In some other embodiments, the backout segment 421 and the slide segment 422 may also be arranged at intervals, and correspondingly, the insertion slot may also include spaced grooves to receive the backout segment 421 and the slide segment 422, respectively.

For the structure in which the first elastic limiting part is provided on the base 30 and the first cooperating part is provided on the connecting end 42, the support member 40 can be manufactured using a left-right parting mold with a simpler mold structure, achieving easier preparation. The base 30 can be manufactured using a top-bottom parting mold.

An engagement relationship between the tooth profile structure 423 and the plurality of limiting teeth 323 can be formed on a single side or on opposite sides. In the case where the engagement relationship is set on a single side, a slide structure can be used on a non-engaging side. Referring to FIGS. 6 and 7, in some embodiments, the first cooperating part has two sets of tooth profile structures 423 located on two opposite side surfaces of the first cooperating part, respectively. The first elastic limiting part has two opposite sets of limiting teeth 323, and the two sets of limiting teeth 323 are configured to engage with the two sets of tooth profile structures 423 of the first cooperating part, respectively, on two sides of the first cooperating part.

When the supporting end 41 is subjected to a squeezing force F1 from the diffusion plate 21, the squeezing force F1 can be resolved into component forces F2 and F3 at contact parts of the tooth profile structures 423 and the limiting teeth 323. The component force F2 can be further resolved into a component force F21 perpendicular to the elastic sheet segment 321 and a component force F22 parallel to the elastic sheet segment 321, and the component force F3 can be further resolved into a component force F31 perpendicular to the elastic sheet segment 321 and a component force F32 parallel to the elastic sheet segment 321.

The elastic sheet segments 321 on both sides are elastically deformed under the action of the component forces F21 and F31, thereby extending outward. When a tooth-tip distance D2 of the limiting teeth 323 on both sides is enlarged to equal to a tooth tip distance D1 of the tooth-shaped structures 423 on both sides, the entire connecting end 42 jumps downward to the next cooperating engagement position under the action of the squeezing pressure F1, and squeezing pressure F1 decreases to some extent after the connecting end 42 slides. If the decreased squeezing pressure is still enough to push the elastic sheet segments 321 on both sides to extend to a certain extent, the connecting end 42 will continue to slide downward, and so on, until the component forces F31 and F32 generated by the squeezing pressure F1 are not enough to cause the elastic sheet segments 321 to deform on both sides to a state that allows the connecting end 42 to continue to slide downward. Hence, such an unidirectional backout tooth engagement structure can adapt to the action of squeezing forces of different magnitudes by different backout displacements, and can achieve an effect of stably holding the support member 40 by the base 30.

Referring to FIG. 5, in some embodiments, the bottom plate 31 has positioning slots 311 or positioning holes for defining the position of the bottom plate 31 relative to the light-emitting assembly 10. The positioning slots 311 can be in a semi-circular or other shape, and the positioning holes can be in a circular, polygonal or other shape. The positioning slots 311 or the positioning holes can cooperate with connectors for positioning to achieve accurate positioning and fixing of the bottom plate 31.

Figure 9:
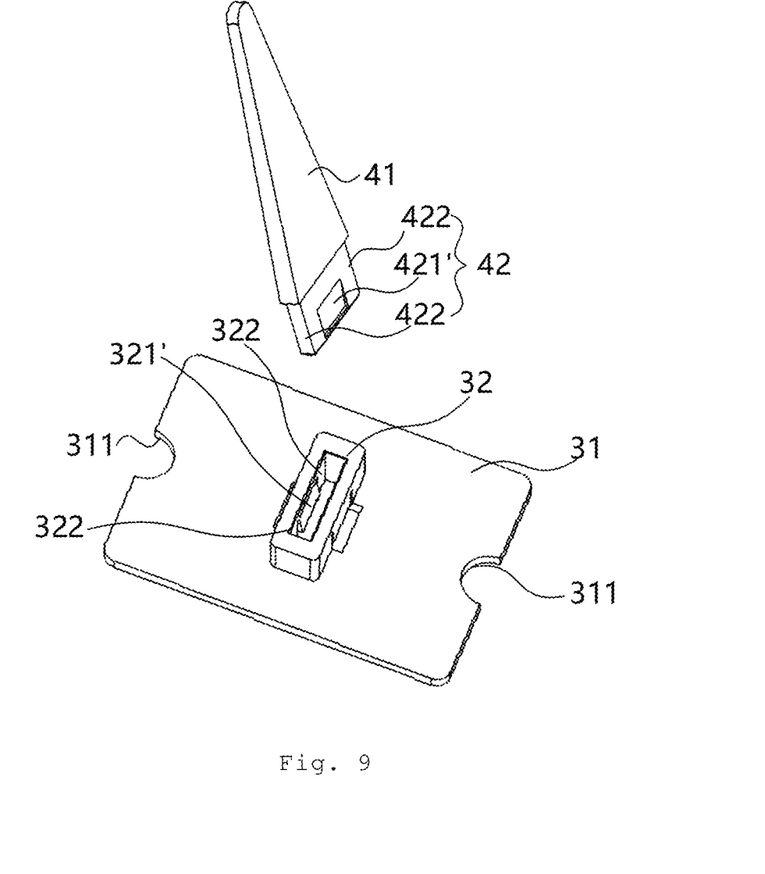
FIG. 9 is an exploded diagram of a support structure in another embodiment of a backlight module according to the present disclosure.
Figure 10:
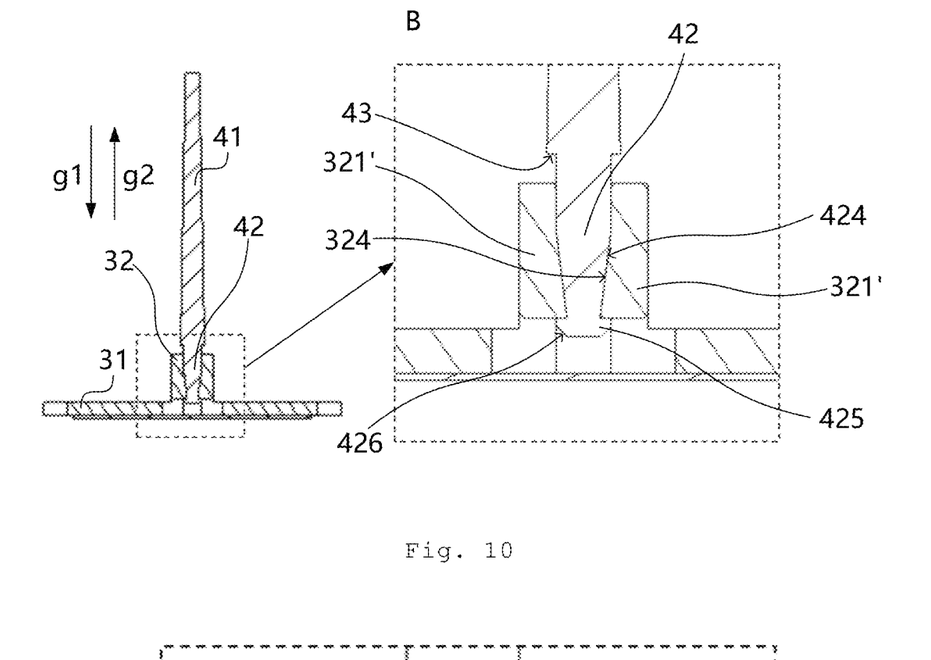
FIG. 10 is a cross-sectional structure and partial enlarged diagram of the support structure in the embodiment shown in FIG. 9.
Figure 11:
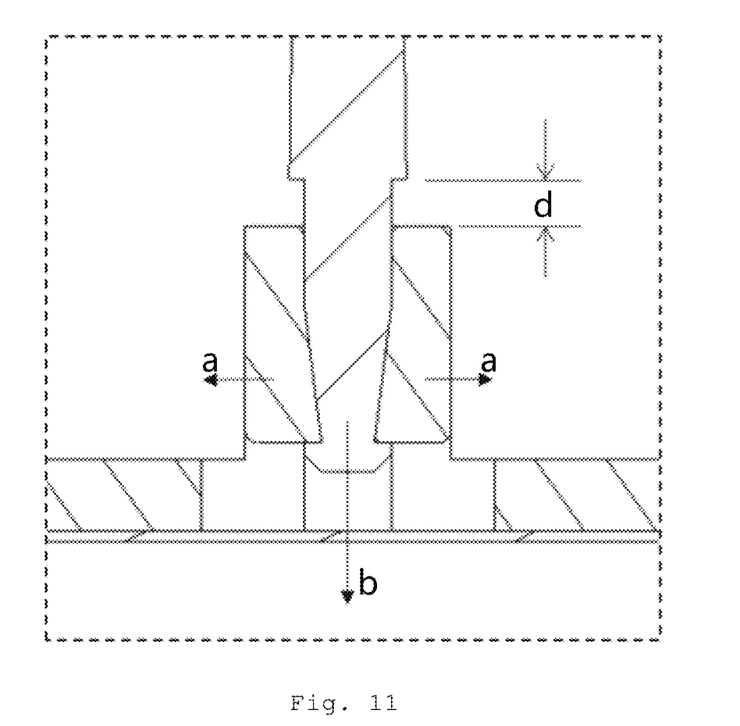
FIG. 11 is a schematic diagram of a force and motion relationship between a connecting end and an elastic sheet segment in FIG. 10.

FIG. 9 is an exploded diagram of a support structure in another embodiment of a backlight module according to the present disclosure. FIG. 10 is a cross-sectional structure and partial enlarged diagram of the support structure in the embodiment shown in FIG. 9. FIG. 11 is a schematic diagram of a force and motion relationship between a connecting end and an elastic sheet segment in FIG. 10.

Referring to FIG. 10, in some embodiments, the backout structure includes a reset backout structure B. The reset backout structure B is configured to reset the connecting end 42 in a direction close to the optical processing assembly 20 after the connecting end 42 backs out in the direction away from the optical processing assembly 20 and when the supporting end 41 is not squeezed by the optical processing assembly 20. In this way, the support member can be reset after the pressure applied by the optical processing assembly 20 is released, thereby achieving a self-adjusting function in height.

In FIG. 10, the reset backout structure B may include a second elastic limiting part and a second cooperating part. The second elastic limiting part has a first wedge-shaped surface 324 inclined relative to the backout direction of the connecting end 42. The second cooperating part has a second wedge-shaped surface 424 inclined relative to the backout direction of the connecting end 42. The second wedge-shaped surface 424 is configured to slide relative to the first wedge-shaped surface 324 during relative movement of the second elastic limiting part and the second cooperating part in the backout direction of the connecting end 42.

Thus, after the supporting end is squeezed to a certain degree, the first wedge-shaped surface and the second wedge-shaped surface slip relative to each other, and the second elastic limiting part extend outward in a direction perpendicular to the backout direction under the squeezing action, thereby allowing the connection segment to move a preset displacement in the backout direction. As the second cooperating part moves, the squeezing force on the supporting end is released, thus eliminating stress concentration at the location of the supporting end. When the supporting end is no longer squeezed by the optical processing assembly, the second elastic limiting part can squeeze, using its elasticity, the second wedge-shaped surface by the first wedge-shaped surface, such that the connecting end is reset in the reset direction.

The second elastic limiting part can be provided on the base 30, and correspondingly the second cooperating part can be provided on the support member 40. In some other embodiments, the second elastic limiting part can also be provided on the support member 40, and correspondingly the second cooperating part can be provided on the base 30.

The structure and connection relationship of the base 30 in the above-described embodiment shown in FIG. 5 can also be applied to this embodiment, that is, the base 30 includes a bottom plate 31 and a mounting seat 32, and the bottom plate 31 is arranged on a surface of a side of the light-emitting assembly 10 adjacent to the optical processing assembly 20, for example being bonded to a surface of the back-plate 11 of the light-emitting assembly 10 or a surface of the bottom reflector sheet 13 by means of an adhesive layer (e.g. double-sided adhesive 33). The mounting seat 32 is arranged on the bottom plate 31 and has an insertion slot, a slot wall of which includes an elastic sheet segment 321' and a guide segment 322.

The elastic sheet segment 321' can be bent and deformed when being squeezed, and can be reset to an initial position when a squeezing force is removed. A second elastic limiting part on the base 30 can be obtained by providing a first wedge-shaped surface 324 on a surface of the elastic sheet segment 321'. The guide segment 322 of the insertion slot except the elastic sheet segment 321', can achieve the afore-mentioned guiding effect of the guide structure in the backout direction. Referring to FIG. 9, the guide segment 322 can include a U-shaped structure located on two sides of the elastic sheet segment 321, in the insertion slot. This can effectively improve the stability during relative movement between the connecting end 42 and the mounting seat 32.

Cooperating with the insertion slot is a insertion column included by the connecting end 42. The insertion column is configured to be connected to the insertion slot by insertion into the insertion slot. An outer wall of the insertion column includes a backout segment 421' forming the backout structure together with the elastic sheet segment 321 and a slide segment 422 forming a slide rail cooperating structure together with the guide segment 322. A second cooperating part provided on the support member 40 can be obtained by providing a second wedge-shaped surface 424 on a surface of the backout segment 421'. The slide segment 422 on two sides of the backout segment 421' can be a cuboid-shaped bump, which slidably cooperates with the U-shaped structure on the two sides of the elastic sheet segment 321' in the insertion slot to achieve a backout guidance function.

In FIG. 9, the backout segment 421' and the slide segment 422 are made in one piece for better strength and stiffness. For example, a downward-tapering wedge-shaped surface can be machined in the middle of each of two sides of a cuboidal boss of the connecting end, or the connecting end of the shape can be obtained directly by injection molding using a mold.

A cooperating relationship between the first wedge-shaped surface 324 and the second wedge-shaped surface 424 can be formed on a single side or on opposite sides. In the case where the cooperating relationship is set on a single side, a non-wedge-shaped surface cooperating structure can be used on the other side. Referring to FIGS. 10 and 11, in some embodiments, the second cooperating part has two sets of second wedge-shaped surfaces 424 located on two opposite sides of the second cooperating part, respectively, and the second elastic limiting part has two opposite sets of first wedge-shaped surfaces 324. The two sets of first wedge-shaped surfaces 324 are configured to be respectively surface-contact the two sets of second wedge-shaped surfaces 424 of the second cooperating part, on the two sides of the second cooperating part and slide relative to the two sets of second wedge-shaped surfaces in the backout direction (direction corresponding to an arrow g1 in FIG. 10) or the reset direction (direction corresponding to an arrow g2 in FIG. 10) of the connecting end 42.

Referring to FIG. 11, when the supporting end 41 is subjected to a squeezing force b from the diffusion plate 21, the squeezing force b can be converted into a vertical component force a to the elastic sheet segments 321' on both sides by cooperation of the wedge-shaped surfaces. The elastic sheet segments 321' on two sides are elastically deformed under the action of the vertical component force a, thereby extending outward. With the extension of the elastic sheet segments 321', the connecting end 42 gradually moves downward under the action of the squeezing force b.

With the downward movement of the connecting end 42, the squeezing force b can be released to a certain degree, and elastic forces of the elastically deformed elastic sheet segments 321' also increase with the degree of extension, thereby achieving an equilibrium between the squeezing force b and component forces of the elastic forces in the backout direction. Once the squeezing force b on the supporting end 41 by the optical processing assembly 20 becomes smaller or disappears, the connecting end 42 is squeezed and moves upward under the action of the elastic forces of the elastic sheet segments 321', thereby arriving at an initial position or reaching a position in equilibrium with the squeezing force b again. Therefore, such a reset backout wedge-shaped surface cooperating structure can provide continuous and stable support for the optical processing assembly that flexes to different degrees while effectively eliminating stress concentration.

Referring to FIGS. 10 and 11, in some embodiments, the connecting end 42 further has an anti-separation structure located on a side of the cooperating part away from the supporting end 41. The anti-separation structure is configured to restrict the second cooperating part from separating from the second elastic limiting part along the reset direction of the connecting end 42 to avoid separation of the connecting end from the base under the action of the second elastic limiting part. In FIG. 10, the anti-separation structure may include a barb 425, the barb 425 having a guide ramp 426 at an end of a side away from the cooperating part. The guide ramp 426 allows the connecting end 42 to pass more smoothly through the space enclosed by the second elastic limiting part when the support member 40 is mounted on the base 30. The barb 425 can reliably rest against one end of the second elastic limiting part to restrict the connecting end 42 from separating.

Figure 12:
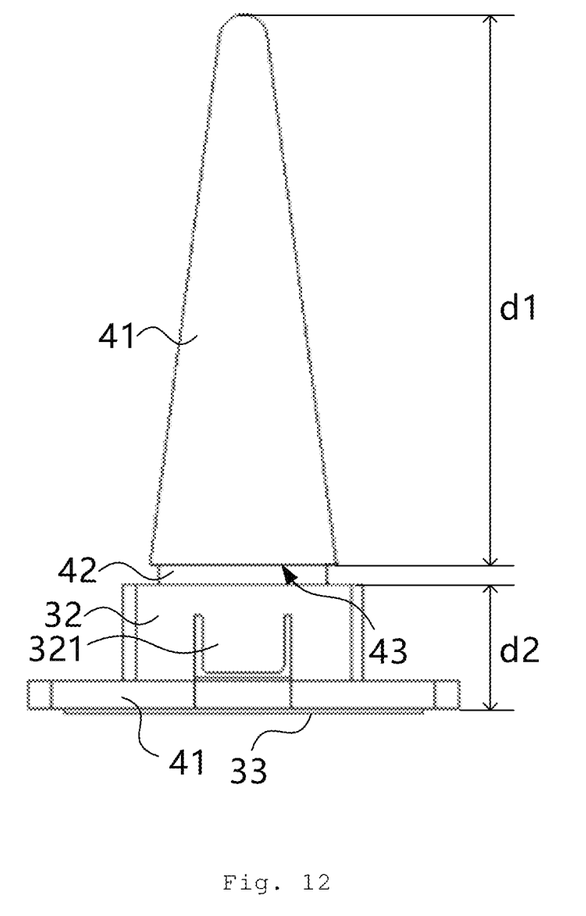
FIG. 12 is a dimension diagram of a support structure in an embodiment of a backlight module according to the present disclosure.

FIG. 12 is a dimension diagram of a support structure in an embodiment of a backlight module according to the present disclosure.

Referring to FIGS. 1 and 12, in some embodiments, in a state where the connecting end 42 reaches a maximum backout position relative to the base 30, the distance from a top end of the supporting end 41 to a bottom end of the base 30 is greater than or equal to a minimum optical distance ODmin of the backlight module. For the backlight module, the distance from the light-emitting assembly to the optical processing assembly in FIG. 1 is an optical distance OD. For the light sources arranged in a certain array manner in the light-emitting assembly, a uniform effect of light is achieved by the optical processing assembly such as the diffusion plate.

If the distance from the light sources or the bottom reflector sheet to the optical processing assembly (such as a surface of the diffusion plate 21 adjacent to the light-emitting assembly 10) is less than the minimum light distance ODmin, the optical processing assembly cannot fully achieve diffusion of light, and thus the contour shapes of the individual light sources will appear to some extent, that is, a checkerboard light shadow will appear. As the distance from the top end of the supporting end 41 to the bottom end of the base 30 is greater than or equal to the minimum optical distance ODmin of the backlight module, in the state where the connecting end 42 reaches the maximum backout position relative to the base 30, the checkerboard light shadow phenomenon can be effectively eliminated and the effect of light homogenization is improved, thereby further improving the backlight quality of the backlight module.

Referring to FIG. 6 and FIGS. 10 to 12, in some embodiments, the connecting end 42 has a step 43 at a position connecting the supporting end 41, and the step 43 is configured to limit a maximum backout position of the connecting end 42 relative to the base 30. When the connecting end 42 backs out in the backout direction as the supporting end 41 is squeezed, the step 43 can limit the maximum backout position by resting against an end face of the mounting seat 32. At that point, the distance d between the step 43 and the end face of the mounting seat 32 in FIG. 1 is 0, and correspondingly, the distance from the top end of the supporting end 41 to the bottom end of the base 30 is the sum of the distance d1 from the top end of the supporting end 41 to the step 43 and the distance d2 from the end face to a bottom face of the mounting seat 32. The distances d1 and d2 satisfy: d1+d2≥ODmin.

In addition, considering that the optical processing assembly supported by the support member is a thin plate structure, and undergoes different flexural deformation when made of different materials. Therefore, in some embodiments, depending on the material of the optical processing assembly, the supporting end 41 can be configured to have a predetermined gap from the optical processing assembly 20 that is not flexurally deformed by the action of a squeezing force or by the action of self-weight, and the predetermined gap is k times a maximum amount of flexural deformation of the optical processing assembly, where k=0.3 to 1. Preferably, k=0.8. In some other embodiments, it is also possible that the supporting end 41 is in contact with the optical processing assembly 20 that is not flexurally deformed by the action of a squeezing force or by the action of self-weight.

For example, assuming that the liquid crystal panel is in direct contact with the diffusion plate in the optical processing assembly, correspondingly the preset gap takes different values for different materials and different degrees of flexure of the diffusion plate. Other factors such as thickness of the diffusion plate can also influence the degree of flexure. For a 55 inch liquid crystal screen, if the material of the diffusion plate is polystyrene (PS), the value of the preset gap can be set to 0.8 time the maximum amount of flexural deformation, i.e. 1.3-1.7 mm; and if the material of the diffusion plate is polycarbonate (PC), the value of the preset gap can be set to 0.8 time the maximum amount of flexural deformation, i.e. 1.1-1.3 mm.

The backlight module of the above embodiments can be used in various types of devices that need to use backlight, such as display devices or lighting devices. Referring to FIG. 1, embodiments of the present disclosure provide a liquid crystal display device including any backlight module embodiment described above and a liquid crystal panel 50, and the liquid crystal panel 50 is located on a light-exiting side of the backlight module. The liquid crystal display device of embodiments of the present disclosure, when in use, can effectively overcome the problem of local dark spots caused by stress concentration due to the screen being squeezed, a manufacturing tolerance or the like, and eliminate the risk of crack of the screen or the optical processing assembly during a push test.

The liquid crystal display device can be a mobile phone, a tablet computer, a television, a display, a notebook computer, a digital photo frame, a navigator, or any other product or component with a display function.

Multiple embodiments in the specification are described in a progressive manner. Focuses of the embodiments are different. For the same and similar parts among the embodiments, refer can be made to each other.

At this point, embodiments of the present disclosure have been described in detail. To avoid obscuring the concept of the present disclosure, some details known in the art are not described. Based on the above description, those skilled in the art can fully understand how to implement the technical solutions disclosed herein.

Although some specific embodiments of the present disclosure have been described in detail by using examples, those skilled in the art should understand that the above examples are only for illustration and not for limiting the scope of the present disclosure. Those skilled in the art should understand that modifications to the above embodiments or equivalent substitutions to part of technical features can be made without departing from the scope and spirit of the present disclosure. The scope of the present disclosure is defined by the appended claims.

What is claimed is:

1. A backlight module, comprising:
a light-emitting assembly;
an optical processing assembly located on a light-exiting side of the light-emitting assembly; and
a support structure located between the light-emitting assembly and the optical processing assembly and connected to the light-emitting assembly, and configured to support the optical processing assembly,
wherein the support structure comprises a base and a support member, the base is fixedly connected to the light-emitting assembly, the support member has a supporting end and a connecting end, the supporting end faces the optical processing assembly, and the connecting end and the base form a backout structure configured to cause the connecting end to back out in a direction away from the optical processing assembly in a case where the supporting end is squeezed by the optical processing assembly; and
wherein the base comprises:
a bottom plate arranged on a surface on a side of the light-emitting assembly adjacent to the optical processing assembly; and
a mounting seat arranged on the bottom plate and having an insertion slot, a slot wall of the insertion slot comprising an elastic sheet segment and a guide segment,
wherein the connecting end comprises an insertion column configured to connect the insertion slot by insertion into the insertion slot, and an outer wall of the insertion column comprises a backout segment forming the backout structure together with the elastic sheet segment and a slide segment forming a slide rail cooperating structure together with the guide segment.

2. The backlight module according to claim 1, wherein the backout structure comprises:

an unidirectional backout structure configured to maintain a backout displacement after the connecting end backs out in the direction away from the optical processing assembly; or a reset backout structure configured to reset the connecting end in a direction close to the optical processing assembly after the connecting end backs out in the direction away from the optical processing assembly and when the supporting end is not squeezed by the optical processing assembly.

3. The backlight module according to claim 2, wherein the unidirectional backout structure comprises:
   a first elastic limiting part having a plurality of limiting teeth arranged in a backout direction of the connecting end; and
   a first cooperating part having a tooth profile structure, wherein the tooth profile structure is configured to engage with the plurality of limiting teeth at a plurality of backout displacements in the backout direction of the connecting end to maintain the backout displacements.

4. The backlight module according to claim 3, wherein
   the first cooperating part has two sets of tooth profile structures located on two opposite side surfaces of the first cooperating part, respectively, and the first elastic limiting part has two opposite sets of limiting teeth which are configured to engage with the two sets of tooth profile structures of the first cooperating part, respectively, on two sides of the first cooperating part; or
   the first elastic limiting part is provided on the base, and the first cooperating part is provided at the connecting end.

5. The backlight module according to claim 1, wherein the light-emitting assembly comprises:
   a back-plate; and
   a plurality of light-emitting units arranged on the back-plate,
   wherein the base is fixedly arranged on the back-plate.

6. A liquid crystal display device, comprising:
   the backlight module of claim 1; and
   a liquid crystal panel located on a light exiting side of the backlight module.

7. The backlight module according to claim 2, wherein the reset backout structure comprises:
   a second elastic limiting part having a first wedge-shaped surface inclined relative to the backout direction of the connecting end; and
   a second cooperating part having a second wedge-shaped surface inclined relative to the backout direction of the connecting end, wherein the second wedge-shaped surface is configured to slide relative to the first wedge-shaped surface during relative movement of the second elastic limiting part and the second cooperating part in the backout direction of the connecting end.

8. The backlight module according to claim 7, wherein
   the second cooperating part has two sets of second wedge-shaped surfaces located on two opposite sides of the second cooperating part, respectively, and the second elastic limiting part has two opposite sets of first wedge-shaped surfaces which are configured to be respectively in surface-contact with the two sets of second wedge-shaped surfaces of the second cooperating part on the two sides of the second cooperating part, and slide relative to the two sets of second wedge-shaped surfaces in the backout direction or a reset direction of the connecting end.

9. The backlight module according to claim 7, wherein the second elastic limiting part is provided on the base, and the second cooperating part is provided at the connecting end.

10. The backlight module according to claim 9, wherein the connecting end further comprises an anti-separation structure located on a side of the cooperating part away from the supporting end, and the anti-separation structure is configured to restrict the second cooperating part from separating from the second elastic limiting part along the reset direction of the connecting end.

11. The backlight module according to claim 10, wherein the anti-separation structure comprises a barb having a guide ramp at an end of a side away from the cooperating part.

12. The backlight module according to claim 1, wherein
    the connecting end further forms a guide structure together with the base, and the guide structure is configured to guide the connecting end in the backout direction of the connecting end relative to the base; or
    in a state where the connecting end reaches a maximum backout position relative to the base, a distance from a top end of the supporting end to a bottom end of the base is greater than or equal to a minimum optical distance of the backlight module.

13. The backlight module according to claim 12, wherein the guide structure comprises a slide rail cooperating structure.

14. The backlight module according to claim 5, wherein the light-emitting assembly further comprises:
    a bottom reflector sheet arranged on a surface on a side of the back-plate adjacent to the optical processing assembly,
    wherein the base is bonded to a surface on a side of the bottom reflector sheet adjacent to the optical processing assembly.

15. The backlight module according to claim 1, wherein the bottom plate has a positioning slot or a positioning hole for defining position of the bottom plate relative to the light-emitting assembly.

16. The backlight module according to claim 12, wherein the connecting end has a step at a position connecting the supporting end, and the step is configured to limit a maximum backout position of the connecting end relative to the base.

17. The backlight module according to claim 1, wherein
    the supporting end is configured to be in contact with or have a predetermined gap from the optical processing assembly that is not flexurally deformed by an action of a squeezing force or by an action of self-weight, and the predetermined gap is k times a maximum amount of flexural deformation of the optical processing assembly, where k=0.3 to 1; or
    the optical processing assembly comprises:
    a diffusion plate located on a side of the support structure away from the light-emitting assembly, and contacting or squeezing the supporting end when the diffusion plate is flexurally deformed towards the light-emitting assembly.

18. The backlight module according to claim 17, wherein k=0.8.

19. The backlight module according to claim 17, wherein the optical processing assembly further comprises at least one of the following:
    a diffusion sheet located on a side of the diffusion plate away from the light-emitting assembly; and a light enhancement sheet located on a side of the diffusion plate away from the light-emitting assembly.

\* \* \* \* \*